Jan. 31, 1950     D. E. AUSTIN     2,496,032
CONNECTOR
Original Filed March 26, 1945
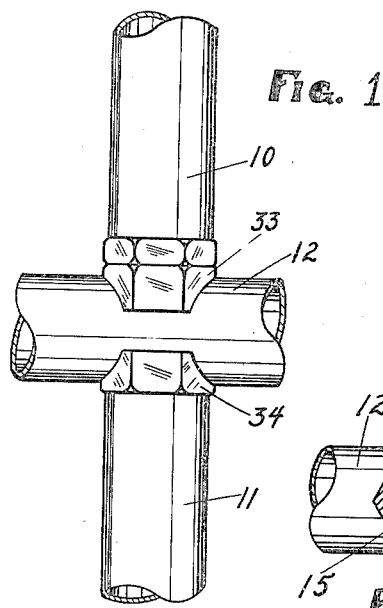
Fig. 1
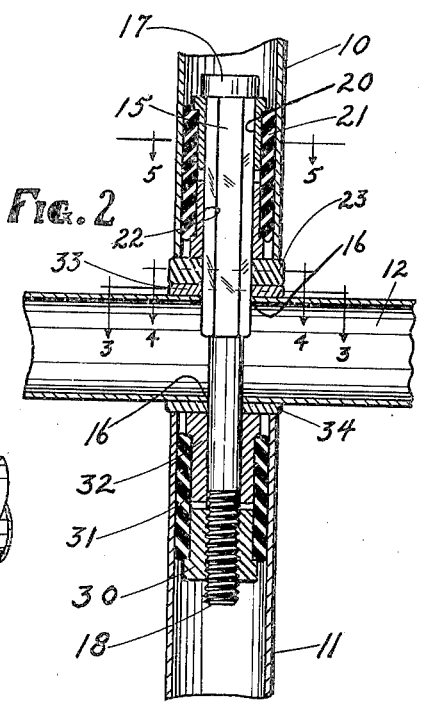
Fig. 2
Fig. 3
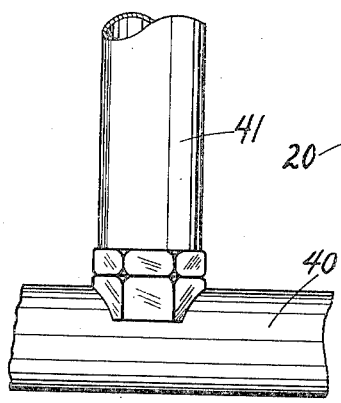
Fig. 6
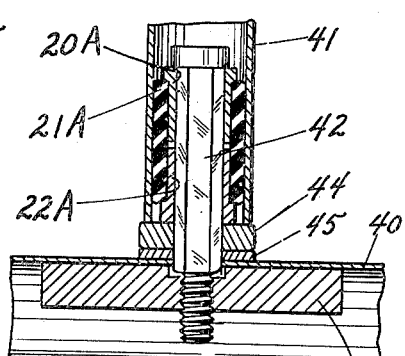
Fig. 7
Fig. 5
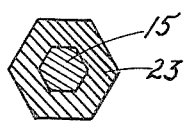
Fig. 4
INVENTOR.
DWIGHT E. AUSTIN
BY Bates, Teare & McBean
ATTORNEYS Patented Jan. 31, 1950

2,496,032

UNITED STATES PATENT OFFICE 2,496,032

CONNECTOR

Dwight E. Austin, Kent, Ohio, assignor to Samuel Moore & Company, Kent, Ohio, a corporation of Ohio Original application March 26, 1945, Serial No. 584,977. Divided and this application October 9, 1946, Serial No. 702,121

7 Claims. (Cl. 287—54)

1

This invention relates to improvements in connector means for joining tubular elements, and the present application constitutes a division of application Serial No. 584,977, filed by me on March 26, 1945, now Patent 2,456,480, December 14, 1948.

An object of the invention is to make a connection which will operate to effect a joint between tubular elements such as stanchion tubes that are used in transportation vehicles. The invention contemplates an assembly wherein the tubular members extend at right angles to each other, without necessitating the use of single or double T-couplings that necessitate splitting and threading of the tubes, and that are difficult to adjust and replace in the event of damage to any particular section.

Referring now to the drawings, Fig. 1 is a side view showing my invention as applied to the joining of tubular members that extend at right angles to each other; Fig. 2 is a section taken on a vertical axis through Fig. 1; Figs. 3, 4 and 5 are sections taken through correspondingly numbered lines of Fig. 2; Fig. 6 is a side view illustrating two tubes connected together at right angles to each other, and Fig. 7 is a section taken vertically through the axis of the tubes shown in Fig. 6.

In Fig. 1 I have shown two tubular members 10 and 11 which are connected in alignment to opposite sides of a tube 12. The connection is made by utilizing a bolt 15 which extends through radial opening 16 in the tube 12 and which has one end 17 thereof disposed within the tube 10, and the other end 18 thereof disposed within the tube 11. The head of the bolt bears against a sleeve 20, which is circular in cross-section and which extends into a resilient bushing 21 from one end thereof. A coacting sleeve 22 extends into the bushing from the other end thereof and bears against a collar 23. The bolt has a non-circular cross-section adjacent the head end thereof, and the collar has a bolt receiving aperture that is shaped complementary to the cross-sectional shape of the bolt shank, as is shown more particularly in Fig. 4, whereby the bolt is non-rotatably but axially movable with respect to the collar. Thus, whenever the collar is turned, the bolt is correspondingly rotated with reference to the various tubes.

The end of the bolt opposite the head is threaded for engagement with a threaded passageway in a sleeve 30 which extends into a resilient bushing 31 from one end thereof, and which coacts with a sleeve 32 that extends into

2 the other end of the bushing for compressing the bushing axially and thereby expanding it radially against the walls of the tube 11.

The resilient bushings 21 and 31 are so made that in their normal position they may be passed freely into the tube, but when compressed and confined against axial movement, may be forced radially against the walls of the tube so as to effect a frictional engagement therewith.

To effect a flat bearing surface for the collar 23 and the head of the sleeve 32, I have shown saddle members 33 and 34, each of which is apertured to clear the shank of the bolt, and each of which has a flat bearing surface on one side for engagement with the collar 23 and the sleeve 32 respectively, and curved surfaces on the inner side thereof for engaging the tube 12. Thus, when the parts are assembled as shown in Fig. 2, and whenever the collar 23 is turned in one direction, the bolt is advanced through the sleeve 30, whereby the resilient bushings or sleeves 21 and 31 are expanded radially against the walls of the tubes 10 and 11, respectively, and a firm clamping action is effected therebetween.

In Figs. 6 and 7, I have shown a connection between two tubes 40 and 41 wherein the joint is made by means of a bolt 42, the head of which lies within the tube 41, and a stationary nut 43 which is threaded to receive the bolt and is disposed within the tube 40. In this arrangement, the shank of the bolt adjacent the head end thereof is non-circular in cross-section and is non-rotatably but axially movable through a complementary-shaped opening in a collar 44 which is positioned between the tube 41 and the saddle 45. The same arrangement of expansible resilient bushing 21A, adjacent the head end of the bolt, with coacting sleeves 20A and 22A, is used in this construction as is shown in Fig. 2, as a result of which, the bushing is expanded against the wall of the tube 41 whenever the collar is turned to clamp the bolt to the nut 43.

An advantage of the present invention as applied to the assembly of a joint between two or more tubes that have their axes at right angles to each other, is that threaded pipe couplings are not required, thus obviating the necessity for splitting and threading the vertically extending tubes. The invention as so applied is also advantageous in that the joint may be readily tightened by means of a wrench applied exteriorly of the tube, and in that the joint enables any section to be readily replaced without disturbing a line of pipe connections.

I claim:

1. A device for effecting a joint between two tubular members which have their axes disposed at an angle to each other, said device comprising a resilient bushing disposed in one of the members, a bolt extending through the bushing and into the other member, a nut on the far side of at least a portion of the last-mentioned member and having threaded engagement with said bolt, and a collar embracing the bolt and disposed between the two tubular members, said collar operating when rotated to rotate the bolt with respect to said nut and to expand the bushing radially against the wall of said tube to effect a clamping action therewith.

2. A device for effecting a joint between two tubular members, the axes of which extend at an angle to each other, said device including a resilient bushing in one of the members, a bolt extending through the bushing and into the other member, a nut member on the far side of at least a portion of said other member and adapted to have a threaded engagement with said bolt, the bolt having a non-circular cross-section along a portion thereof, a collar having an aperture therein complementary to the cross-sectional shape of the non-circular portion of the bolt, a bearing member interposed between the collar and one of the tubular members and having an aperture therein through which the bolt may be freely rotated, said collar operating when rotated in one direction to tighten the bolt and thereby to exert pressure on the bushing in an axial direction, and means for restraining axial expansion of the bushing, whereby the bushing expands radially to effect a clamping action against the wall of the associated tube.

3. A device for effecting a joint between two aligned tubes, and a third tube, the axis of which intersects the axes of the first-mentioned tubes, said device including a resilient bushing disposed in each of the two first-mentioned tubes, a bolt extending through said bushings and also through the third tube, a member in one of the tubes having a threaded passageway for coacting with the threads on said bolt and operating when the bolt is tightened with respect thereto to expand the respective bushings radially against the walls of the associated tubes, and a collar embracing the bolt and disposed adjacent the end of one tube for enabling the bolt to be rotated with reference to the tubes by pressure applied to the collar exteriorly of the tubes.

4. A device for effecting a joint between two tubes, the axes of which intersect, said device comprising a resilient bushing disposed within one tube, a bolt projecting through the bushing and into the other tube, a nut positioned in the last-mentioned tube for threaded engagement with said bolt and a member slidably embracing the bolt and disposed between said tubes, said member being accessible for rotation at a point exteriorly of the tubes, and operating when rotated in one direction to tighten the bolt, and thereby to expand the bushing into clamping engagement with the wall of the associated tube.

5. A device for effecting a joint between two tubular members disposed at an angle to each other, said device comprising a resilient bushing disposed in the first member, a bolt extending through said bushing and beyond the first member and passing at least into the second member, externally accessible means between the two tubular members for rotating the bolt, and means bearing on the far side of at least a portion of said second member and including a nut engaging threads on the bolt.

6. A device for effecting a joint between three tubes, two of which align with each other and stand on opposite sides of the third tube which extends transversely of the other two, said device including a resilient bushing disposed in each of the aligned tubes, a bolt extending through said bushings and the intermediate tube, a nut in one of the aligned tubes coacting with threads on the bolt, and means for rotating the bolt.

7. A device for effecting a joint between two cylindrical tubes which have their axes at an angle to each other and one of which abuts an intermediate region of the other, a saddle having a flat exterior and a concave interior bearing against said intermediate region, a collar between the flat face of the saddle and the end of the abutting tube, a resilient bushing in such abutting tube, a bolt occupying the bushing extending through the collar, a nut for said bolt, the bolt having a non-circular exterior portion and the collar having a correspondingly shaped aperture through which the bolt extends whereby the collar may rotate the bolt.

DWIGHT E. AUSTIN.

REFERENCES CITED

The following references are of record in the file of this patent:

UNITED STATES PATENTS

| Number | Name | Date |
|---|---|---|
| 641,895 | Scovil | Jan. 23, 1900 |
| 2,075,714 | Hamill | Mar. 30, 1937 |
| 2,214,177 | Raybould | Sept. 10, 1940 |

FOREIGN PATENTS

| Number | Country | Date |
|---|---|---|
| 305,966 | Great Britain | Feb. 12, 1929 |
| 24,292 | Australia | Dec. 23, 1929 |
| 172,311 | Switzerland | Oct. 15, 1934 |